Patented Apr. 23, 1929.

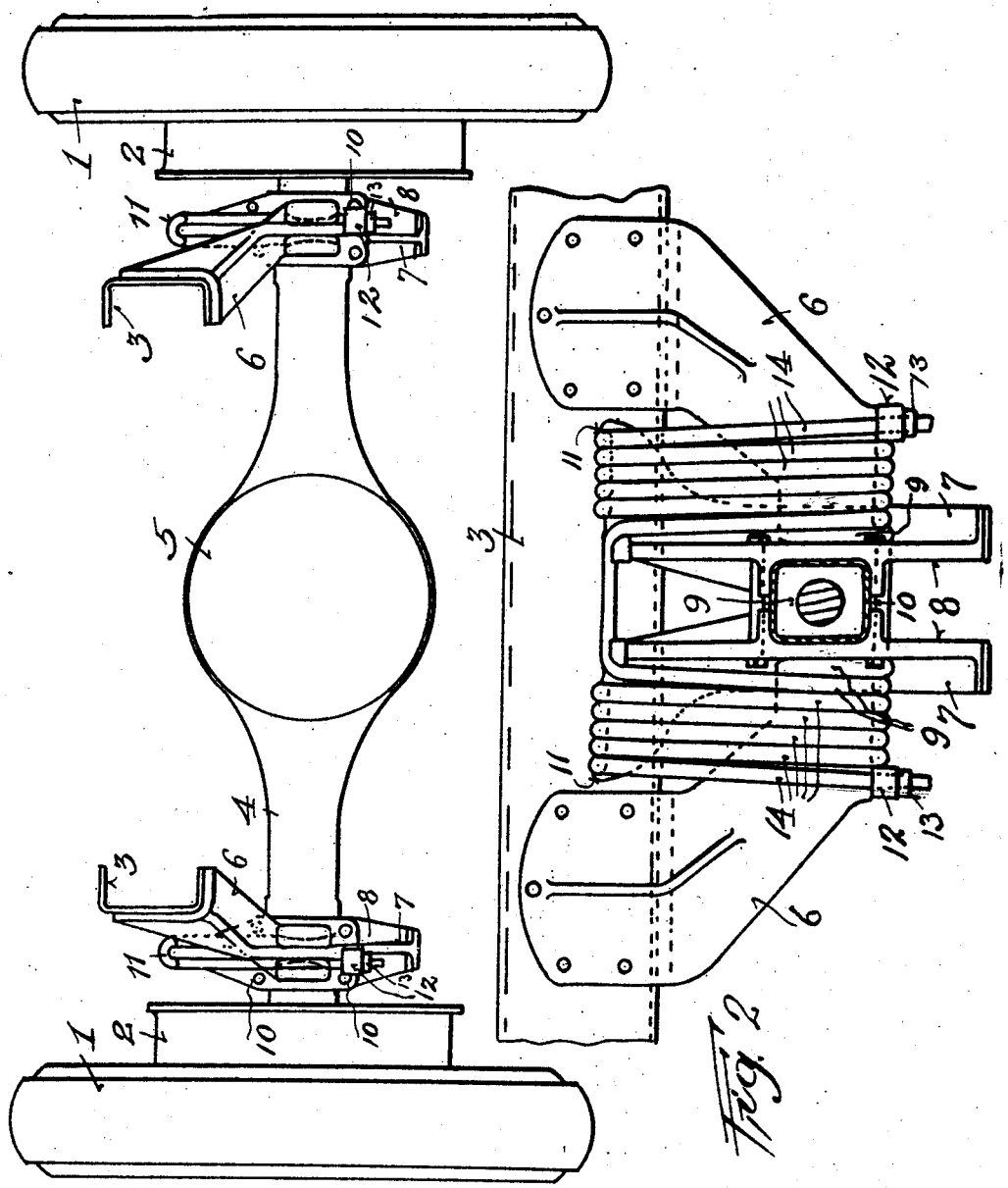

1,709,991

UNITED STATES PATENT OFFICE.

RICHARD E. MARSTON, OF FAIRPORT, NEW YORK, ASSIGNOR, BY MESNE ASSIGNMENTS, TO JAMES T. BRYAN, OF GARDEN CITY, NEW YORK.

VEHICLE SUSPENSION CONSTRUCTION.

Application filed September 29, 1927. Serial No. 222,766.

This invention relates broadly to a construction adapted to support the unsprung weight of vehicles.

One of the objects of this invention is the provision of a resilient suspension for vehicles which is adapted to absorb shocks incident to the travel of the vehicle over uneven surfaces.

A further object of this invention is the provision of a new construction for accomplishing this purpose which employs extensible members such as rubber strands or cords for absorbing such shocks.

A further object of the invention is the provision of a construction permitting relative movement between the axles and chassis of the vehicle against the resistance of a plurality of rubber strands.

A still further object of this invention is to provide a construction for these purposes which is relatively cheap and simple to manufacture but nevertheless rugged in construction and adapted for long use.

These and many other objects as will appear from the description are successfully sought by means of the following construction.

This invention resides substantially in the combination, construction, arrangement and relative location of parts as will appear in the following description when taken in conjunction with the drawings.

Referring to the drawings,

Figure 1 is a side elevational view of the construction employed in this invention showing the side chassis members in cross section.

Fig. 2 is an enlarged side elevational view of the suspension members.

In the usual construction of vehicle suspension devices, such for instance as the well known elliptical spring construction, it is found, that instead of absorbing shocks due to the movement of the vehicle over the road, there is a tendency only to deflect the body of the vehicle rather than to absorb the shocks. The result is that the vehicle body is violently thrown from side to side or upwardly when the wheels encounter rough spots in the road so that the whole vehicle is subjected to undue stresses and strains which cause a rapid deterioration of the parts. There is also a tendency for the spring structure to be shattered. It is the purpose of this invention to provide a construction which is suitable for use on passenger vehicles as well as heavy trucking vehicles which will absorb the shocks rather than deflect them.

In the construction of this invention it is proposed to employ a plurality of rubber strands or other suitable extensible elements which will truly absorb the shocks without transmitting them to the body of the vehicle. It is, of course, recognized that rubber cords or strands have been used before for a similar purpose. This invention however relates to a particular construction which provides a parallel means for employing rubber strands for supporting vehicle bodies.

Referring to the drawings in Fig. 1 there is shown the road wheels 1 and the usual brake bands 2 which are mounted on the axle 9' (Fig. 2) which extends through the hollow casing 4, the differential being shown in Fig. 5. The side members of the chassis are shown at 3 and are arranged to rest in the L-shaped formation of the brackets 6 which are secured thereto and depend therefrom. The brackets 6 are arranged in pairs, two pairs being placed on each side of the chassis as will be readily understood. The lower ends of the brackets extend horizontally and at right angles to their main portion and are provided at their ends with vertical slots. These horizontal extensions are presented toward each other but are separated somewhat. The axle receiving member is shown at 8 comprising two parts which are secured together by a number of bolts 10. Each of these parts has a vertically extending rib 7 which are arranged in the slots at the horizontal ends of the bracket 6 and which have been indicated by the reference numerals 9. The upper ends of the members 8 are provided with horizontal extensions 11 as shown in Fig. 2. Hollow socket members are shown at 12 and are formed integral with the bracket 6. A single length of rubber rope or strand is shown as comprising a plurality of turns 14 which are wrapped around the horizontal portions 9 of the bracket 6 and the extensions 11 of the members 8. The lengths of the rubber cord are secured in the sockets 12 by means of tapered wedges 13. It is pointed out that the specific clamping means when taken alone, forms no part of this invention.

From the foregoing description it will be apparent that the vehicle body and chassis are supported on the wheels and axle by means of the plurality of strands of rubber cords 14 which are under tension. Whenever the wheels of the vehicle strike an unevenness in the ground they will tend to re-bound upwardly carrying the construction comprising the members 8 vertically upward against the resistance of the rubber strands 14. The relative movement between the members 8 and the bracket 6 is guided by reason of the fact that the rib members 7 are arranged to slide in the slots in the end of the horizontal portions 9 of the bracket 6.

From the foregoing description it will be apparent that I have devised a relatively simple construction for carrying out the purposes of this invention. While I have shown one embodiment of the invention in the drawings, I wish it to be understood that there are many changes in the details of construction and relative arrangement of parts as will be readily apparent to those skilled in the art and I do not desire therefore, to be limited except as required by the appended claims.

What I seek to secure by United States Letters Patent is:

1. The combination with a vehicle chassis of a pair of spaced depending brackets presented towards each other, an axle receiving member adapted for movement with respect to said brackets and guided thereby and means under tension for resisting the movement of said axle receiving member.

2. The combination with a vehicle chassis of a pair of spaced depending brackets presented towards each other, an axle receiving member having ribs on each side for engagement with said brackets to permit of guided vertical movement of said axle receiving member with respect to said brackets and a plurality of rubber strands for resisting said movement.

3. The combination with a vehicle chassis of a pair of spaced depending brackets presented towards each other, an axle receiving member having ribs on each side for engagement with said brackets to permit of guided vertical movement of said axle receiving member with respect to said brackets, a plurality of rubber strands for resisting said movement and means for securing the ends of said strands.

4. In a vehicle suspension device the combination with a vehicle chassis of a pair of depending brackets attached thereto in spaced relation, an axle receiving member having ribs arranged to cooperate with said brackets to permit guided movement of said axle receiving member, a plurality of rubber members adapted to resist said movement and gripping means for securing said rubber member.

5. In a vehicle suspension construction the combination with a vehicle chassis of brackets secured thereto each having a portion extending at right angles thereto and presented towards each other but spaced apart, an axle receiving member arranged for vertical movement between said brackets and a plurality of rubber strands arranged to support said chassis on said axle receiving member and to resist relative movement between said brackets and said axle receiving member.

6. The combination with a vehicle chassis of a pair of spaced brackets secured thereto each having a portion extending towards the other and having a slot in the end of each of said portions, an axle bearing member having a rib on each side to fit in said slots to permit of guided movement of said axle receiving member with respect to said brackets and rubber strands to control said movement.

7. The combination with a vehicle chassis of a pair of spaced brackets secured thereto each having a portion extending toward the other and having a slot in the end of each of said portions, an axle bearing member having a rib on each side to fit in said slots to permit of guided movement of said axle receiving member with respect to said brackets, an extension on each side of said axle receiving member and a plurality of rubber strands encircling said extensions and portions to resist relative movement between said axle receiving member and said brackets.

8. The combination with a vehicle chassis of a pair of spaced brackets secured thereto each having a portion extending toward the other and having a slot in the end of each of said portions, an axle bearing member having a rib on each side to fit in said slots to permit of guided movement of said axle receiving member with respect to said brackets, an extension on each side of said axle receiving member, a plurality of rubber strands encircling said extensions and portions to resist relative movement between said axle receiving member and said brackets and means for securing the ends of said strands.

9. The combination with a vehicle chassis of a pair of spaced brackets secured thereto each having a portion extending toward the other and having a slot in the end of each of said portions, an axle bearing member having a rib on each side to fit in said slots to permit of guided movement of said axle receiving member with respect to said brackets, an extension on each side of said axle receiving member, a plurality of rubber strands encircling said extensions and portions to resist relative movement between said axle receiving member and said brackets, means on said brackets for receiving the ends of said strands and means for gripping the ends of said strands in said means.

In testimony whereof I have hereunto set my hand on this 24th day of September, A. D. 1927.

RICHARD E. MARSTON.